United States Patent [19]

Maeda et al.

[11] Patent Number: 5,659,529
[45] Date of Patent: Aug. 19, 1997

[54] DATA ENCODER

[75] Inventors: Yasuaki Maeda, Kanagawa; Hideki Nagashima, Tokyo, both of Japan

[73] Assignee: Sony Corporation, Tokyo, Japan

[21] Appl. No.: 530,073

[22] Filed: Sep. 19, 1995

[30] Foreign Application Priority Data

Sep. 20, 1994 [JP] Japan .................. 6-250208

[51] Int. Cl.$^6$ .................................. G11B 7/00
[52] U.S. Cl. ................... 369/59; 369/47; 369/32; 360/48
[58] Field of Search ............... 369/59, 60, 47, 369/48, 49, 50, 54, 58, 32, 124; 360/48, 51, 53

[56] References Cited

U.S. PATENT DOCUMENTS 5,422,871  6/1995  Nakashima et al. ............ 369/54 X
5,453,967  9/1995  Aramaki et al. ................ 369/54 X

*Primary Examiner*—Muhammad N. Edun
*Attorney, Agent, or Firm*—Limbach & Limbach L.L.P.

[57] ABSTRACT

A data encoder wherein the outputs of a synchronization data generating means 51, a cluster counter 52, a sector counter 53, a recording data output means 56 and a dummy data generating means 55 are selected by a selector 57 to provide an output. A selector control means 59 is constituted to control the selector 57 to output a data group (cluster) which is one recording unit formed of the predetermined number of sectors in the predetermined format by controlling the selector 57 in a predetermined timing depending on a Link signal based on the sector counter 53 and a count value of the byte counter 60. The processing load shared on a microcomputer, which is controlling the recording operation, can thus be alleviated remarkably.

4 Claims, 6 Drawing Sheets

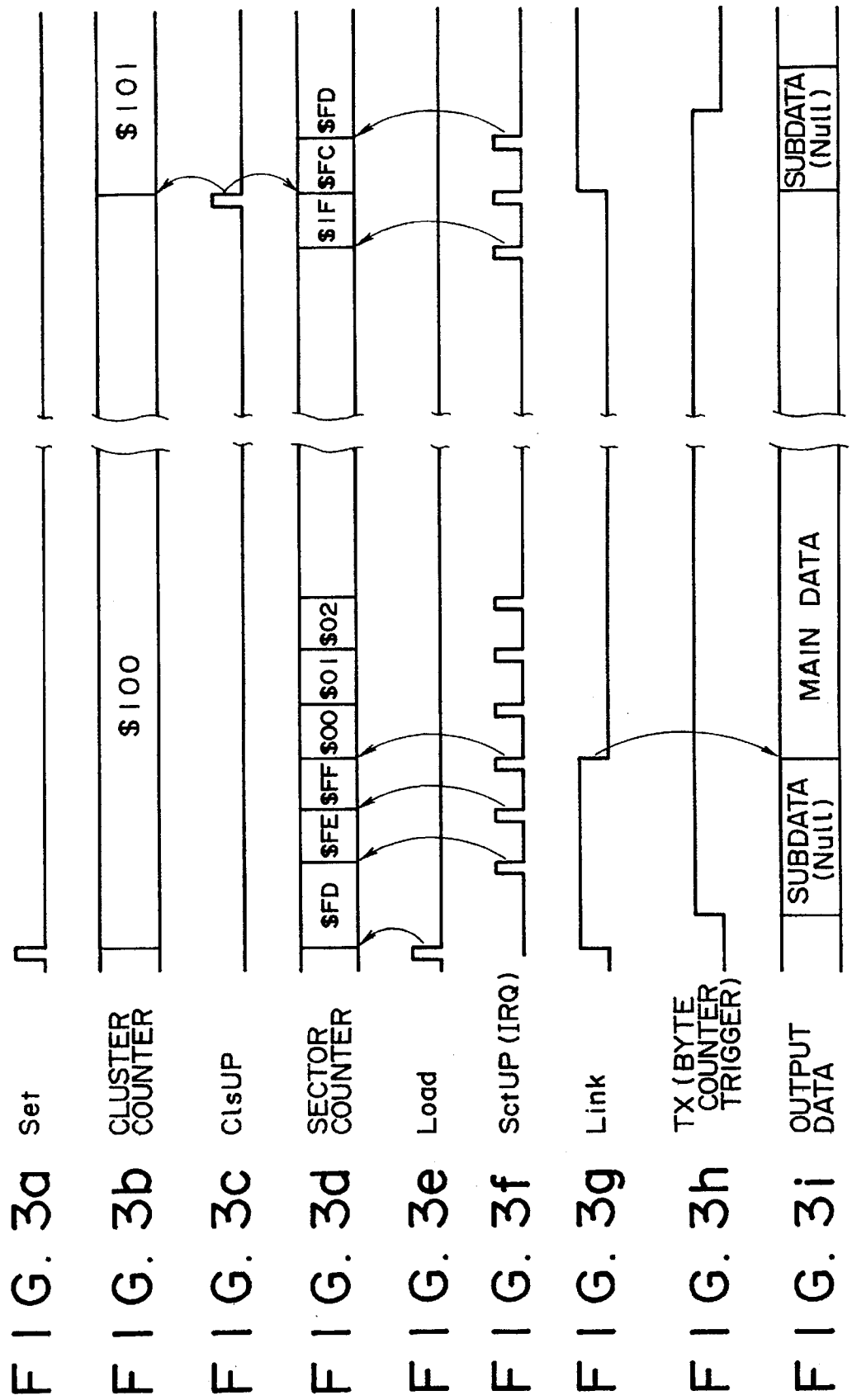

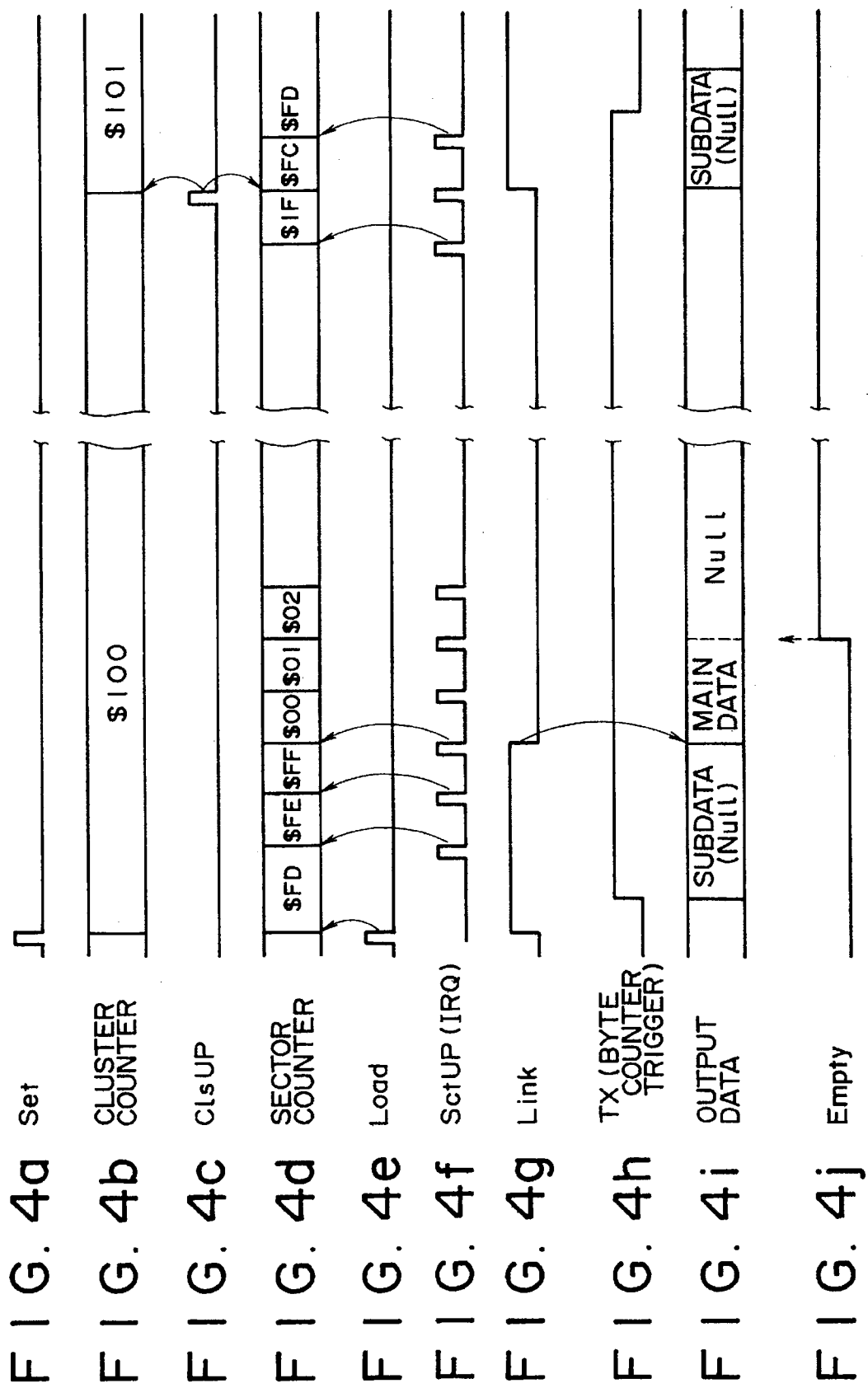

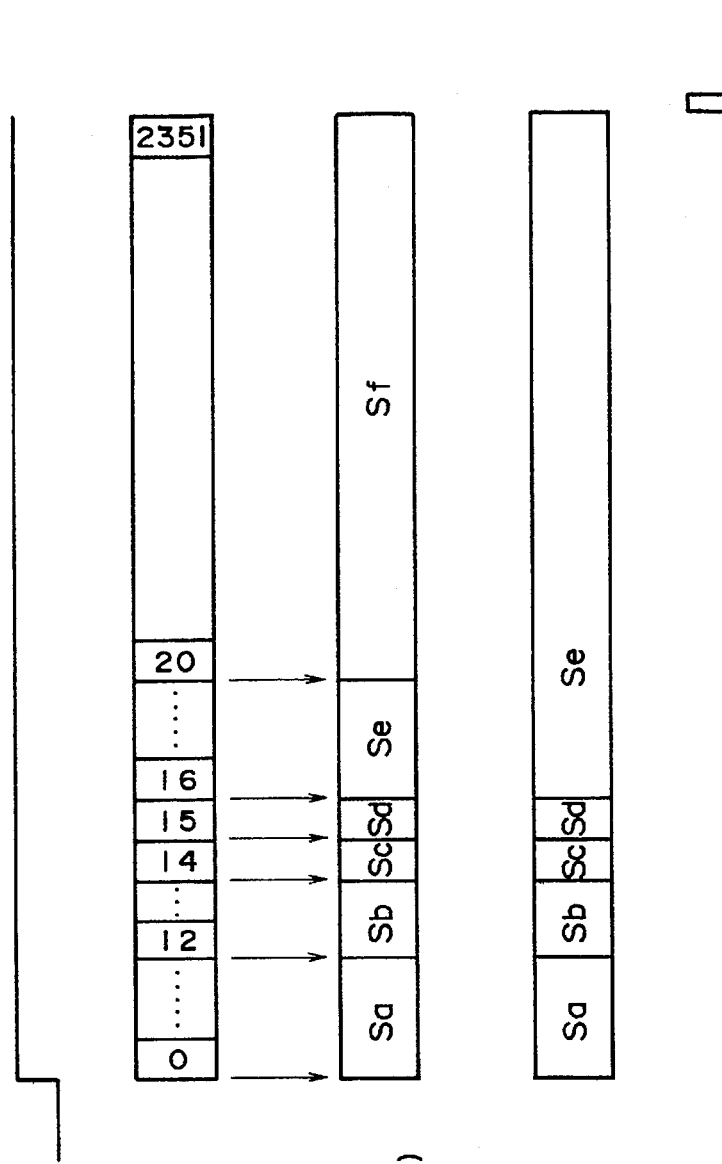

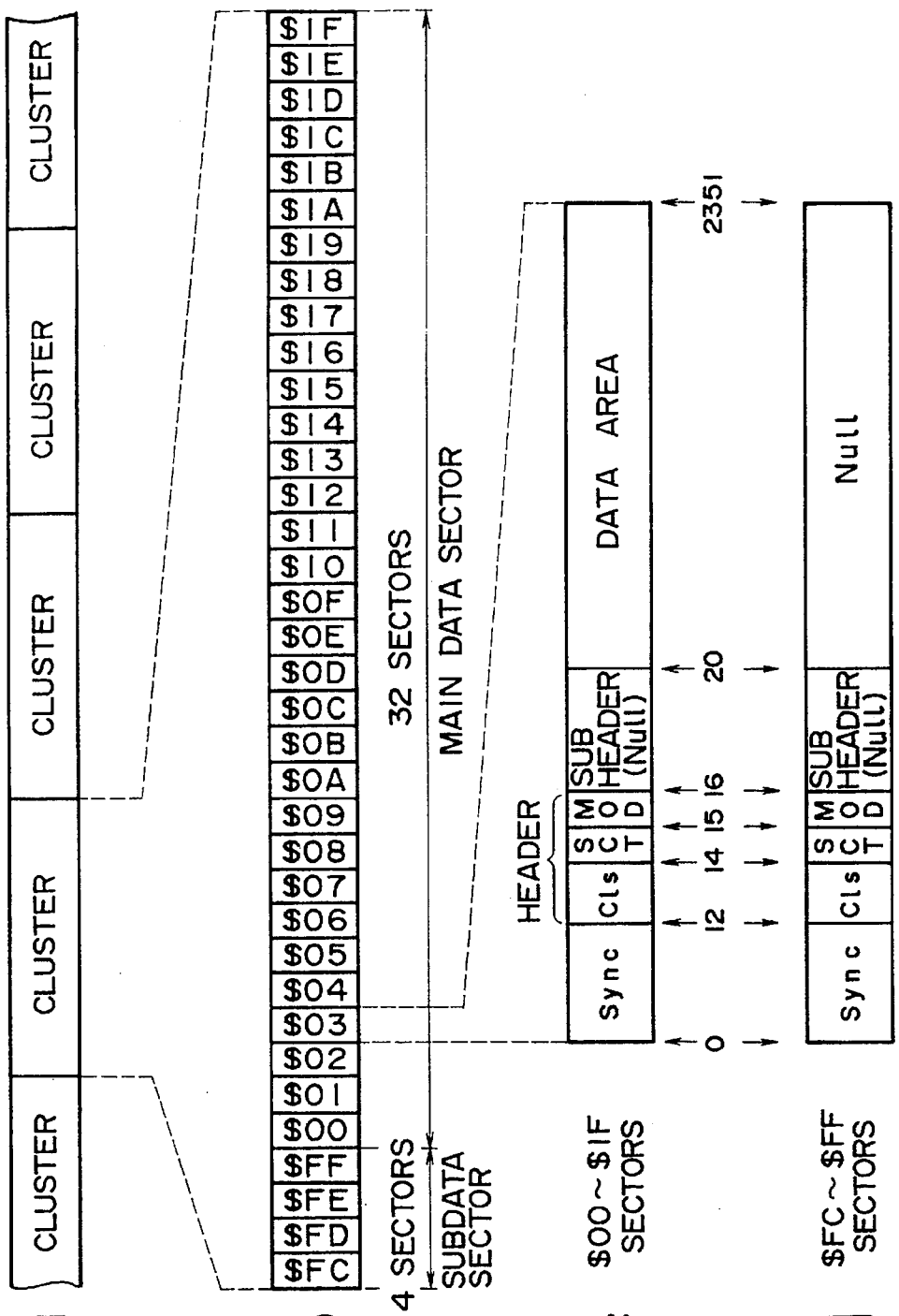

DATA ENCODER

BACKGROUND OF THE INVENTION

1. Field of the invention

The present invention relates to a data encoder for generating data groups to be recorded by the recording system to record the data in the predetermined format on a recording medium such as a magneto-optic disc.

2. Description of Related Art

A variety of digital data recording media have been put into practical use in these years with inclusion of well known systems, for example, a reproduction-only system utilizing an optical disc such as a compact disc system and a minidisc system allowing users to record/reproduce the audio data on a recording medium such as a magneto-optic disc.

In a minidisc system, the recording operation to a magneto-optic disc is performed in units of clusters. That is, a cluster is the minimum unit for the recording operation.

As shown in FIGS. 6a and 6b, one cluster is composed of 36 sectors. The 32 sectors from $00 to $1F among these sectors are defined as the main data sectors to record actual audio data and administration information. The remaining four sectors from $FC to $FF are defined as the subdata sectors.

The recording operation in units of cluster is started from the center of the sector $FD in the linking region and the data is recorded in the 32 sectors from $00 to $1F.

The main data sectors $00 to $1F respectively have a sector format as shown in FIG. 6c. One sector is composed of 2352 bytes from the byte 0 to the byte 2351. The predetermined data is recorded as the synchronization pattern in the first 12 bytes from the byte 0 to the byte 11.

Next, the bytes 12 and 13 are defined as the cluster address and the byte 14, as the sector address. As explained above, an address is recorded in each sector using three bytes. Continuously, mode data is recorded with one byte of the byte 15. The four bytes from the byte 12 to the byte 15 are defined as a header of each sector.

Moreover, the four bytes from the byte 16 to the byte 19 are defined as a subheader and these bytes are actually used for recording of zero (Null) data.

Following the subheader, the 2332 bytes from from the byte 20 to the byte 2351 are defined as a data area to be actually used for the recording of audio data and administration information.

The subdata sector from the sector $FC to sector $FF which is called as the linking region has the same sector format as the main data sector. However, in the subdata sector, the 2332 bytes forming a data area from the byte 20 to the byte 2351 are all used for recording of zero (Null) data as the dummy data as shown in FIG. 6d.

When audio data is inputted for the recording in a minidisc system, such audio data is once compressed and thereafter is sequentially fetched into a buffer RAM in data amount units each corresponding to one sector. The data is then sequentially read from the buffer RAM to form a data stream of the sector format with the addition of a synchronization pattern, a cluster address, a sector address, mode data and a subheader as shown in FIG. 6.

Sector data thus generated undergoes Advanced Cross Interleaved Reed Solomon Code (ACIRC) and Eight to Fourteen Modulation (EFM) encoding and is then supplied to a recording head for the recording into a magneto-optic disc.

Here, in view of generating sector data obtained by adding the synchronization pattern, etc. to the main data such as audio data, a microcomputer provided for controlling the recording operation has transmitted a command for setting the cluster and sector address in each transfer timing of sector data.

Moreover, the main data area is designated by the Null data in the subdata sector as explained above and therefore the microcomputer has issued also a command to give the Null data to the data area for generation of such subdata sector.

In addition, such control must be performed before the sector data is transferred for the ACIRC and EFM encoding and therefore the microcomputer always has to administrate the information about one preceding sector.

As a result, here lies a problem that a processing load to be shared on the microcomputer increases remarkably with occasional occurrence of an additional problem in generation of wrong setting of the sector address.

SUMMARY OF THE INVENTION

The present invention has been proposed considering such problems of the prior art and it is therefore an object of the present invention to alleviate the processing load to be shared on the microcomputer.

Therefore, a data encoder is constituted to output a data group (cluster) which is formed as one recording unit when each cluster is respectively constituted by the predetermined number of sectors formed in the predetermined format including at least synchronization data, address data and main data.

Such data encoder comprises synchronization data generating means, data group address counter means, sector address counter means, main data output means, dummy data generating means, byte counter means, selector means and selector control means.

The selector means can selectively provide an output from the outputs of the synchronization data generating means, data group address counter means, sector address counter means, main data output means and dummy data generating means.

The byte counter means counts up a byte position within the sector. The selector control means is constituted to provide an output of the data group as one recording unit formed of the predetermined number of sectors in the predetermined format from the sector means through the switching control of the selector means in the predetermined timing depending on the counted values of the sector address counter means and the byte counter means.

Moreover, in accordance with an encoding output start control signal, a data group address is set to the data group address counter means and the predetermined sector address value is set to the sector address counter means. Thereafter, the sector address counter means is incremented depending on a count value of the byte counter means and the data group address counter means is incremented depending on a count value of the sector address counter means.

Moreover, the selector control means is constituted, when the predetermined sectors among those forming a data group as one recording unit are used for arrangement of dummy data as the main data, to control the selector means so that an output timing of the sector in which dummy data is arranged as the main data is detected from a count value of the sector address counter means and the data is outputted from the dummy data generating means at the main data output timing of the sector.

Furthermore, the selector control means is also constituted to control the selector means so that the data from the dummy data generating means is outputted at the main data output timing for the subsequent sectors when it is detected that the data is no longer outputted from the main data output means.

With formation of a data encoder having the constitution explained above, the microcomputer which is controlling the recording operation is not required to execute the processing to generate sector data by adding the synchronization signal and address to the main data such as audio data.

Moreover, since the addresses are set by the counting operations of the data group address counter means and sector address counter means, wrong addressing can be almost eliminated.

BRIEF DESCRIPTION OF THE DRAWINGS

FIGS. 3a to 3i show an explanatory diagram of the operation timings of the data encoder as the embodiment.

FIGS. 4a to 4j show an explanatory diagram of the operation timings of the data encoder as the embodiment.

FIGS. 5a to 5e show an explanatory diagram of the operation timings of the data encoder as the embodiment.

FIGS. 6a to 6d show an explanatory diagram of sector format of a minidisc.

DESCRIPTION OF THE PREFERRED EMBODIMENT

A recording/reproducing apparatus comprising a data encoder as a preferred embodiment of the present invention will be explained hereunder.

Figure 2:
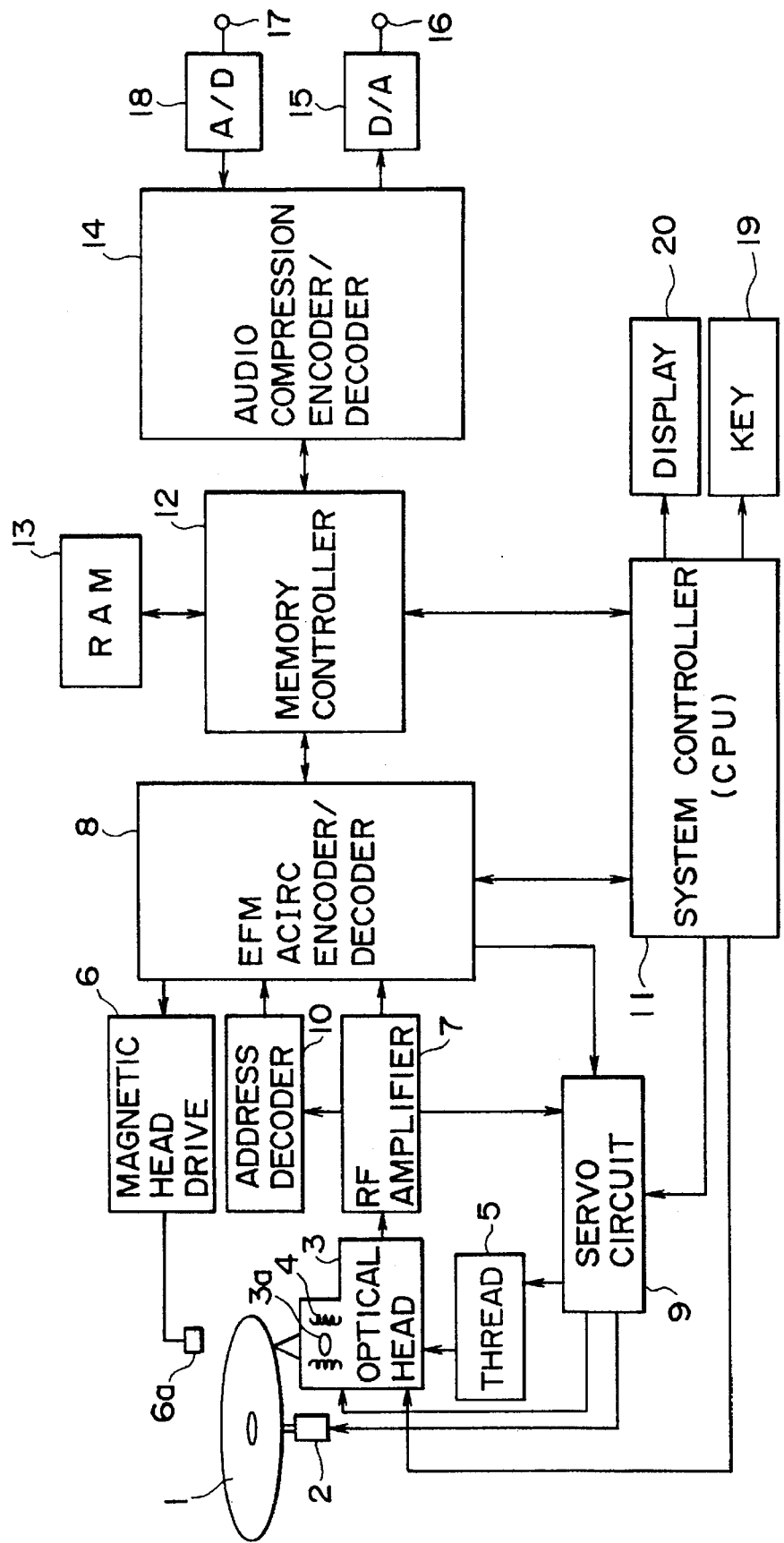
FIG. 2 is a block diagram of a recording/reproducing apparatus to which the data encoder as the embodiment is loaded.

FIG. 2 is a block diagram of a recording/reproducing apparatus (minidisc recording/reproducing apparatus). In FIG. 2, the reference numeral 1 designates a magneto-optic disc which is rotatably controlled by a spindle motor 2; 3, an optical head to irradiate the disc 1 with a laser beam during the recording/reproducing operations. For the recording operation, the optical head outputs a high level laser beam to heat a recording track up to the Curie temperature, while for the reproducing operation, it outputs a comparatively low level laser beam to detect the data from the laser beam reflected by the magnetic Kerr effect.

For execution of the data read operation from a disc 1, the optical head 3 comprises an optical system consisting of a laser diode as laser output means, a deflection beam splitter and an objective lens, etc. and a detector for detecting reflected laser beam. The objective lens 3a is held movable in the disc radius direction and in the direction to access to or separate from the disc by means of a 2-axis mechanism 4 and moreover the optical head 3 as a whole can be moved in the disc radius direction with a sled mechanism 5.

Information detected from a disc 1 with the optical head 3 by the reproducing operation is supplied to an RF amplifier 7. The RF amplifier 7 extracts a reproduced RF signal, a tracking error signal, a focus error signal, a group information (information of wobbling grooves on a magneto-optic disc 1), etc. through the arithmetic processing of the information supplied. The reproduced RF signal is then supplied to an encoder/decoder 8. Moreover, the tracking error signal and focus error signal are then supplied to a servo circuit 9.

The servo circuit 9 generates various kinds of servo drive signals with the tracking error signal and focus error signal supplied and a track jump command and an access command from a system controller 11 to execute the focus and tracking control by controlling the 2-axis mechanism 4 and sled mechanism 5.

The spindle motor 2 is controlled to the constant line velocity (CLV) using a groove information and a clock of groove address decoded from the groove information. In addition, the spindle motor 2 is controlled to be driven or stopped with control signals for spindle kick and spindle brake transferred from the system controller 11.

The reproduced RF signal undergoes the EFM decoding and ACIRC decoding in the encoder/decoder 8 and is then once written into the buffer RAM 13. A data read operation from the magneto-optic disc 1 by the optical head 3 and transfer of reproduced data to the buffer RAM 13 from the optical head 3 are carried out (intermittently) at a rate of 1.41 Mb/s.

The data written into the buffer RAM 13 is read in the timing when the transfer of reproduced data is carried out at a rate of 0.3 Mb/s and is then supplied to an encoder/decoder 14. The data is converted into an analog signal by a D/A converter 15 through the processing for the reproduced signal such as the decoding process against the audio compression processing and is supplied as the reproduced output to the predetermined amplifier circuit from terminals 16, for example, as the L-channel and R-channel audio signals.

Here, a so-called shock-proof function can be realized by once intermittently writing the data read from the disc 1 into the buffer RAM 13 at a higher rate and then reading such data at a lower rate to provide an audio output. This function ensures that an audio output can be provided continuously without any intermission even when the tracking servo is temporarily lost, disabling the data read operation from the disc 1.

An address decoder 10 executes the EFM demodulation and bi-phase decoding to the groove information supplied from the RF amplifier 7 to output a groove address. This groove address and address information which is decoded in the encoder/decoder 8 are supplied to the system controller 11 through the encoder/decoder 8 and are used for various control operations.

For execution of the data recording operation to a disc 1 (magneto-optic disc), a recording signal (analog audio signal) supplied to a terminal 17 is converted to a digital signal by a A/D converter 18 and is then supplied to the encoder/decoder 14 to undergo the audio compression encoding process. The recording data compressed by the encoder/decoder 14 is once written into the buffer RAM 13 and is also read in the predetermined timing, followed by transfer to the encoder/decoder 8. Having completed the encoding process such as the ACIRC encoding and EFM demodulation in the encoder/decoder 8, the recording data is supplied to the magnetic head drive circuit 6.

The magnetic head drive circuit 6 supplies a magnetic head drive signal to the magnetic head 6a in accordance with the encoded recording data. That is, this magnetic head drive circuit 6 causes the magnetic head 6a to apply the magnetic field N or S to the magneto-optic disc 1. Moreover, in this case, the system controller 11 supplies a control signal to the optical head 3 to output a laser beam of the recording level.

The system controller 11 is formed of a microcomputer to execute control operations of respective portions as explained above depending on the operations by users and an internal program.

The reference numeral 19 designates an operation input section comprising the keys used for operations by users and 20 designates a display unit formed, for example, of a liquid crystal display.

In such a recording/reproducing apparatus, audio data having completed the audio compression encoding for the recording operation, is once stored in the buffer RAM 13. The audio data is then read sequentially from the buffer RAM 13 in the data amount unit (2332 bytes) corresponding to one sector to form a data stream of a sector format with the addition of a synchronization pattern, a cluster address, a sector address, mode data and a subheader as shown in FIG. 6. After completion of the ACIRC and EFM encoding in the encoder/decoder 8, the data is supplied to the magnetic head drive circuit 6 for the recording on the magneto-optic disc.

Here, in the case of this embodiment, a data encoder for generating such sector data is formed within the memory controller 12.

Figure 1:
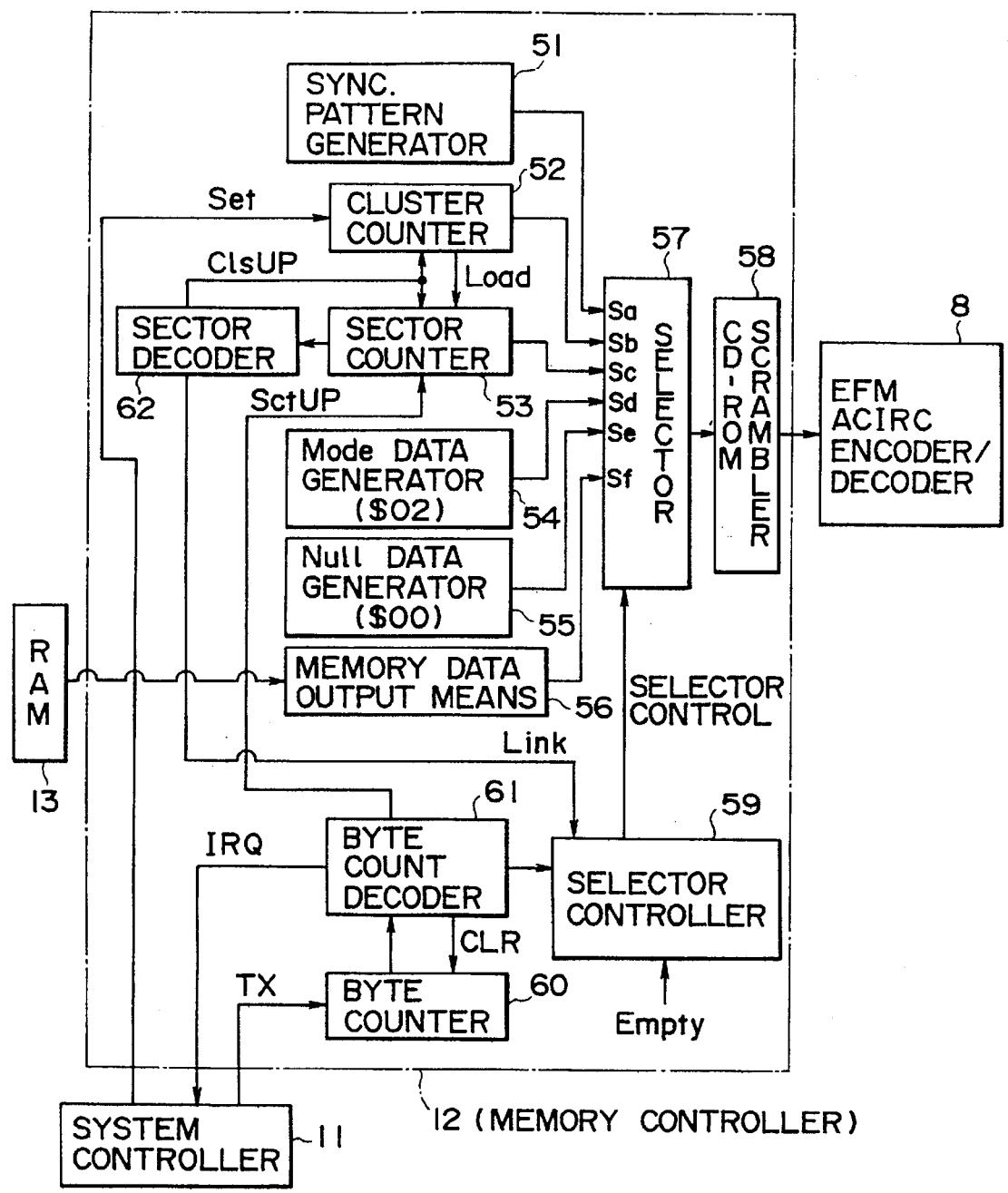
FIG. 1 is a block diagram of a data encoder as a preferred embodiment of the present invention.

FIG. 1 illustrates a data encoder of the preferred embodiment of the present invention to be formed in the memory controller 12.

In addition to the data encoder, an interface with the encoder/decoder 14, an interface with the buffer RAM 13 and circuits such as a write/read address generator also exist within the memory controller 12, but these are not illustrated. Only the structural elements as the data encoder are illustrated in FIG. 2.

The reference numeral 51 designates a sync pattern generator which generates a particular synchronization pattern of 12 bytes.

The numeral 52 designates a cluster counter for generating a cluster address. The initial count value of the cluster counter 52 may be set to a desired value with a Set signal from the system controller 11. Moreover, the cluster counter 52 allows increment of the count value with a ClsUP signal.

The numeral 53 designates a sector counter for generating a sector address. To the sector counter 53, the predetermined value is loaded with a Load signal from the cluster counter 52. Moreover, the sector counter 53 allows incrementing the count value with a SctUP signal.

A value loaded by the Load signal from the cluster counter 52 becomes $FD. Namely, when a certain value is loaded to the cluster counter 52 with a Set signal from the system controller 11, the cluster counter 52 loads $FD to the sector counter 53 with the Load signal.

Moreover, when the cluster counter 52 allows incrementing the count value with the ClsUP signal, this ClsUP signal is also supplied simultaneously to the sector counter 53 and $FC is loaded to the sector counter 53 in this timing. The sector address must be changed to $FC from $1F when the cluster address changes, because the sector addresses in the cluster are extended to $1F from $FC as shown in FIG. 6b.

The numeral 54 designates a mode data generator to generate a fixed value $02 for the mode byte (byte 15) of one byte within the sector.

The numeral 55 designates a Null data generator to generate the data $00 which becomes dummy data.

The numeral 56 designates memory output means to read the data stored in the buffer RAM 13 as an output.

The numeral 57 designates a selector which selects any one required from the inputs Sa to Sf and offers it as an output. Outputs of respective circuits are applied to the above inputs. That is, outputs of the sync pattern generator 51, cluster counter 52, sector counter 53, mode data generator 54, Null data generator 55 and memory data output means 56 are supplied respectively to the inputs Sa, Sb, Sc, Sd, Se and Sf.

An output of the selector 57 is sector data having the format illustrated in FIG. 6. After having completed the processing in the CD-ROM scrambler 58, such data is transferred to the encoder/decoder 8.

The numeral 59 designates a selector controller which controls selection of the inputs Sa to Sf by the selector to generate the sector data in the predetermined timing.

The numeral 60 designates a byte counter and the numeral 61 designates a byte count decoder. The byte counter 60 counts up the bytes by triggering the TX signal from the system controller 11 to operate as a counter for counting the number of bytes to be transferred in the sector.

The byte count decoder 61 decodes a count value of the byte counter 60. Since one sector is composed of 2352 bytes, this byte count decoder 61 outputs a SctUP signal to the sector counter 53 for the increment of the sector counter 53 when the byte counter 60 shows the count value 2351. Simultaneously, this byte count decoder outputs a CLR signal to the byte counter 60 to reset the count value to 0.

Moreover, the byte count decoder 61 outputs an IRQ signal (Interrupt Signal at End of Transmission), together with the SctUP signal, to the system controller 11. The system controller 11 can detect the current sector address by providing therein a counter for counting the IRQ signal.

In addition, the byte counter decoder 61 supplies a byte information to the selector controller 59, causing it to execute the switching control of the selector 57 in the sector.

The numeral 62 designates a sector decoder for decoding the current sector addresses ($FC to $1F) from a count value of the sector counter 53. When the sector address becomes $1F, the sector decoder outputs a ClsUP signal for the increment of the cluster counter 52 and also for loading $FC to the sector counter.

Meanwhile, the sector decoder 62 outputs a Link signal in the timing that the sector address is any one of $FC to $FF to supply this signal to the selector controller 59. This signal suggests that the subsectors which are considered in current as the linking region are being transferred. The selector controller 59 performs the switching control of the selector 57 corresponding to the subdata sectors with this Link signal.

When it is detected that there is no data to be read in the buffer RAM 13, an Empty signal is supplied to the selector controller 59. This Empty signal is generated when an input count value of the memory controller 12 transferred from the encoder/decoder 14 matches the count value read from the buffer RAM 13. That is, the Empty signal is generated in the timing that if there is no data to be written into the buffer RAM 13 even when the main data is inputted and thereafter the stored data is all read from the buffer RAM 13.

Operations of this data encoder will be explained with reference to FIGS. 3a to 3j, FIGS. 4a to 4j and FIGS. 5a to 5e.

FIGS. 3a to 3i show operation timings for recording of clusters.

As shown in FIGS. 3a and 3b, the system controller 11 sets a certain cluster number (cluster address) to the cluster counter 52 with a Set signal. For example, it is here assumed that the cluster number=$100 is set.

In this case, as shown in FIG. 3d and 3e, the cluster counter 52 issues a Load signal to the sector counter 53 to load $FD as a count value of the sector counter 53.

Next, when the system controller 11 outputs a TX signal as a trigger signal as shown in FIG. 3h, the byte counter 60 starts its operation.

Depending on the count value of the byte counter 60, the byte count decoder 61 supplies a byte information to the selector controller 59.

As shown in FIG. 5b and 5d, when a byte count value is 0, that is, when the byte count is started, the selector controller 59 sets the selector 57 to the input Sa. Thereby, the synchronization pattern from the sync pattern generator 51 is outputted during the period defined by the transfer bytes 0 to 12.

As shown in FIG. 6, the bytes 12, 13 of each sector define a cluster address. Therefore, as shown in FIG. 5b and 5d, the selector controller 59 switches the selector 57 to the input Sb after the byte count value reaches 11. Thereby, the count value $100 of the cluster counter 52 is outputted as the cluster address in the transfer timing of the bytes 12, 13.

The byte 14 of each sector defines a sector address. Therefore, the selector controller 59 switches the selector 57 to the input Sc after the byte count value reaches 13. Thereby, the count value $FD of the sector counter 52 is outputted as the sector address in the transfer timing of the byte 14.

The byte 15 of each sector defines mode data. Therefore, the selector controller 59 switches the selector to the input Sd after the byte count value reaches 14. Thereby, the data $02 is outputted as the mode data from the mode data generator 54 in the transfer timing of the byte 15.

The bytes 16 to 19 of each sector define a subheader consisting of Null data. Therefore, the selector controller 59 switches the selector 57 to the input Se after the byte count value reaches 15. Thereby, the data $00 from the Null data generator 55 is outputted in the transfer timing of bytes 16 to 19.

The bytes 20 to 2351 of each sector define a data area. However, when a sector is the subdata sector, the data area is given the Null data. In the transfer timing that $FD is first loaded to the sector counter 53, the sector decoder 62 outputs the Link signal because the sector is the subdata sector (FIG. 3g).

Thereby, the selector controller 59 sets the selector 57 to the input Sf in the transfer timing of data area defined by the bytes 20 to 2351 in order to output each byte as the Null data.

Namely, during the transfer period of the first sector $FD, the selector 57 is switched as shown in FIG. 5d depending on the count value of the byte counter 60.

When the byte counter 60 counts up to 2351, the byte counter decoder 61 resets the byte counter 60 to 0 and outputs a SctUP signal (FIG. 4e and FIG. 3f). Thereby, the count value of the sector counter 53 becomes $FE. In this timing, since the $FE is the subdata sector, the Link signal is outputted continuously. Therefore, the selector 57 is switched as shown in FIG. 5d during the transfer period of the sector $FE. Namely, the synchronization pattern, cluster address $100, sector address $FE, mode data $02, subheader and main data defined by Null data are outputted.

Moreover, the selector 57 is also switched and the sector data is outputted as shown in FIG. 5d during the transfer period of the sector $FF after transfer of the sector $FE is completed and the sector counter 53 shows a value $FF.

Next, when transfer of the sector $FF is completed and the sector counter 53 shows a value $00 with a SctUP signal, output of the Link signal is stopped as shown in FIG. 3g.

During the transfer period of the sector $00, the selector 57 is controlled as shown in FIG. 5c.

Namely, after the input Sa is selected and the synchronization pattern is outputted, the input Sb is selected to output the cluster address $100, the input Sc is selected to output the sector address $00, the input Sd is selected to output the mode data $02, the input Se is selected to output the subheader by the Null data, respectively. Subsequently, in the transfer timing from the byte 2 to the byte 2351, the selector controller 59 connects the selector 57 to the input Sf because there is no Link signal in view of outputting the data, that is, audio data read from the buffer RAM 13, from the memory data output 56.

Thereafter, while the sector counter 53 shows the sector values in the range from $01 to $1F, the selector 57 is controlled as shown in FIG. 5c during the transfer timing of the sectors $01 to $1F to transfer the sector as the main data sector because the Link signal is not outputted as is obvious from FIG. 3d and 3g.

When the sector counter shows a value $1F and the sector $1F is transferred until the byte counter 60 reaches 2351, the sector decoder 62 outputs a ClsUP signal as shown in FIG. 3c).

Thereby, the cluster counter 52 is incremented to show the count value $101 (FIG. 3b). Moreover, the value $FC is loaded to the sector counter 53 with the ClsUP signal (FIG. 3d).

Since the sector $FC indicates the linking region (subdata sector), the sector decoder 62 outputs the Link signal. Accordingly, during the transfer period of the sector $FC, the selector controller 59 controls the selector 57 as shown in FIG. 5d.

During the transfer of the next sectors $FD to $FF, the selector controller 49 also controls the selector 57 as shown in FIG. 5d.

For the sectors from $00, the selector controller 59 controls the selector 57 as shown in FIG. 5c.

The recording in units of cluster is completed at the sector $FD. Therefore, at the end of recording operation, the system controller 11 cancels (FIG. 3h) trigger of the byte counter 60 with the TX signal when the transfer of sector $FD is completed. Therefore, the system controller 11 has to detect the sector numbers of the sectors being transferred. For this purpose, the IRQ signal is counted as explained above or a count value of the sector counter 53 is fetched.

Since the recording is performed in units of clusters, an input data such as audio data is often lost during the recording of a certain cluster. For example, new data is not fetched into the buffer RAM 13 and the stored data are all read therefrom in the course of a certain cluster. The recording operation itself is continued until the sector $FD where the relevant cluster comes to the end. Therefore, the main data is all defined by the Null data for the sectors until the end of the cluster.

For example, as shown in FIG. 4j, it is assumed that data stored in the buffer RAM is all read therefrom depending on the end of transfer of the sector $01 and the Empty signal is inputted to the selector controller 59. Thereby, the selector controller 59 controls the selector 57 to select the input Se in the transfer timing of main data of bytes 20 to 2351 to transfer the output of the Null data generator 55. That is, the selector controller 59 switchingly controls the selector 57 as shown in FIG. 5d.

As explained above, when the data encoder of the preferred embodiment is constituted within the memory controller 12, the system controller 11 can be freed from transmission of the command for setting the cluster and sector address for each transfer timing of the sector data and transmission of the Null data setting command after generation of Null data in the subdata sectors and subheader bytes and the Empty signal.

Moreover, it is no longer required to always administrate the information about one preceding sector. Thereby, the processing load shared on the system controller 11 can be alleviated remarkably.

In the preferred embodiment, the data encoder of the present invention is loaded into a minidisc system, but this data encoder can also be employed into a variety of other systems.

The structure of the data encoder is not limited to that shown in FIG. 1 and various modifications can also be embodied.

As explained previously, the data encoder of the present invention offers an effect that the microcomputer controlling the recording operation can remarkably reduce its processing load because it is freed from the processing to generate the sector data by adding the synchronization signal and address to the main data such as the audio data.

Moreover, since the address is set with the counting operations of the data group address counter means and sector address counter means, wrong addressing can be eliminated almost perfectly.

What is claimed is:

1. A data encoder for outputting a data group as one recording unit which is constituted by a predetermined number of sectors each of which is formed in a predetermined format including at least synchronization data, address data and main data, comprising:

synchronization data generating means;

data group address counter means;

sector address counter means;

main data output means;

dummy data generating means;

selector means for selectively outputting the outputs of said synchronization data generating means, said data group address counter means, said sector address counter means, said main data output means and said dummy data generating means;

byte counter means for counting byte positions in the sector; and selector control means which can control said selector means to output a data group as a recording unit formed of the predetermined number of sectors in the predetermined format by controlling said selector means in a predetermined timing depending on the count values of said sector address counter means and said byte counter means.

2. A data encoder according to claim 1, wherein after a data group address is set to said data group address counter means depending on an encode output start control signal and a predetermined sector address value is set to said sector address counter means, said sector address counter means is incremented depending on a count value of said byte counter means, and said data group address counter means is incremented depending on a count value of said sector address counter means.

3. A data encoder according to claim 1, wherein the predetermined number of sectors among those forming a data group as one recording unit are defined by dummy data as the main data, and said selector control means detects an output timing of the sectors defined by dummy data as the main data depending on a count value of said sector address counter means and controls said selector means so that the data from said dummy data generating means are outputted in the main data output timing of the relevant sectors.

4. A data encoder according to claim 1, wherein said selector control means controls, upon detecting that data is no longer outputted from said main data output means, said selector means so that the data from said dummy data generating means are outputted at the main data output timing as the outputs of the subsequent sectors.

* * * * *